United States Patent Office
3,015,625
Patented Jan. 2, 1962

3,015,625
LUBRICANT COMPRISING A LUBRICATING OIL
AND AN UREIDO COMPOUND
Robert J. Rosscup, Chamblee, Ga., and Hubert J. Liehe,
Hammond, Ind., assignors to Standard Oil Company,
Chicago, Ill., a corporation of Indiana
No Drawing. Filed July 21, 1958, Ser. No. 750,050
16 Claims. (Cl. 252—49.6)

This invention relates to new additive agents for lubricants, and more particularly pertains to new compositions of matter suitable for use as gelation or thickener agents in greases.

It is an object of the present invention to provide a new composition of matter, particularly adopted for use in the formulation of improved lubricants. Another object of the invention is to provide improved lubricating greases. A further object of the invention is to provide improved thickening agents for lubricant greases which are stable and give excellent lubrication at elevated temperatures. Still another object of the invention is to provide a concentrate of an oil-thickener which is capable of being blended with lubricating oil vehicles to obtain a lubricant grease.

A further object is to provide a readily producible series of greases embodying a novel class of thickening agents capable of yielding lubricants particularly suitable for use at temperatures of from about 250° F. to about 450° F. Another object of the invention is to provide an improved multi-purpose lubricating grease. These and additional objects will be apparent from the following detailed description.

In accordance with the present invention, the new composition of matter is a ureido compound having the general formula

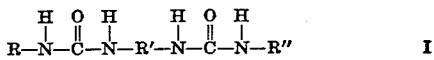

where R and R'' are the same or different abietyl radicals selected from the group consisting of a dehydoabietyl radical, a dihydroabietyl radical, and tetrahydroabietyl radical and mixtures thereof and R' is an alkylene radical or substituted alklene radical of from 1 to about 30 carbon atoms or an arylene radical or a substituted arylene radical. The radicals R, R' and R'' can contain substituents such as, for example, alkyl, alkoxy, cyano, aryl, hydroxy, carboxy, halogen, nitro and other substituent group. The alklylene radical can be straight and/or branched chain, and the arylene radicals can be mononuclear or polynuclear such as phenylene, biphenylene, naphthylene, anthrylene and phenanthrylene radicals. The terms "alkylene and arylene radicals" as ised here in and in the appended claims includes subtituted alkylene radicals and substituted arylene radicals.

The general structural formula of the above-named bietyl radicals are:

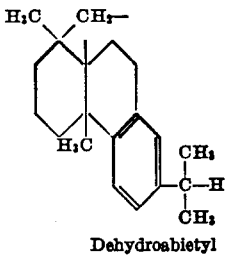

Dehydroabietyl

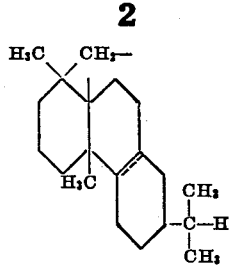

Dihydroabietyl

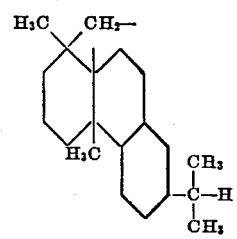

Tetrahydroabietyl

The ureido compound can be prepared by heating a mixture of an abietyl amine such as hereinafter named and a polyisocyanate in the equivalent weight ratio of 1:1, at a temperature within the range of room temperature (about 70° F.) to about 450° F.

Examples of such abietyl amines, i.e. aliphatic amines attached to an alicyclic structure, which can be used in the preparation of the above described ureido compounds are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of abietyl amines in the following approximate proportion:

| | "Rosin Amine D" percent |
|---|---|
| Dehydroabietyl amine | 60 |
| Dihydorabietyl amine | 30 |
| Tetrahydroabietyl amine | 10 |

Examples of suitable polyisocyanates are tolylene diisocyanate; p,p'-diisocyanate biphenyl; 1,4-diisocyanatobenzene; p, p-diisocyanato-diphenylmethane; 1,6-diisocyanato-hexane; 1,12-diisocyanato-dodecane; 1,3,5-benzene-triisocyanate; naphthylene diisocyanate; bitolylene diisocyanate; tris-p-isocyanato-phenylmethane; etc.

The following is illustrative of the apparent reaction which takes place:

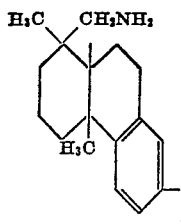
Dehydroabietylamine

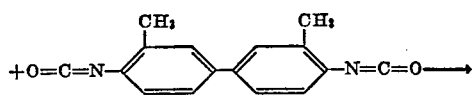

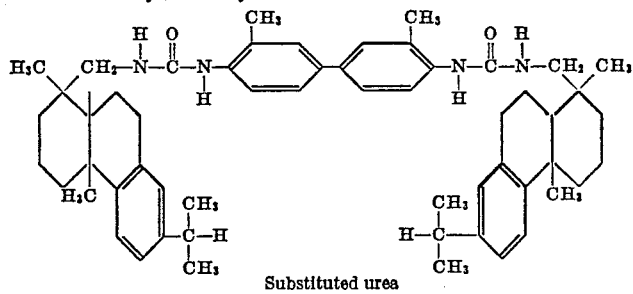
Bitolylene diisocyanate

Substituted urea

The following example illustrates the preparation of the ureido compound of the present invention:

EXAMPLE I

Rosin Amine D (310.8 g.; 1.03 moles) and benzene (700 mls.) were placed in a 2 liter flask equipped with a stirrer, dropping funnel and a reflux condenser. A solution of bitolylene diisocyanate (133.2 g., 0.5 mole) in 425 milliliters warm benzene was added over a period of 6 minutes to the stirring amine solution. The benzene started to reflux after about ⅔ of the isocyanate solution was added. The solution was heated to maintain reflux after the addition was completed. Reflux was continued for one hour.

The benzene was then distilled off until the solution became too viscous to stir effectively, and more solvent was removed by heating to 40°–50° C. at 3 mm. mercury. The solids were removed from the flask, ground to a powder and placed in a vacuum desiccator at 2 mm. Hg for several hours. The powder was thoroughly washed with ethyl ether to remove any excess amine and again desiccated at 2 mm. Hg for 4 hours. A yield of 258.3 grams of product was obtained.

A portion of the washed powder was placed in an oven and heat-treated at 388° F. for 45 minutes.

188.3 grams of the ether-washed, but not oven heat-treated product was combined with 1883 grams of a 500 SSU at 100° F. petroleum oil and heated to 400° F. thickening was noted at 356° F. After heat-treating at 400° F. for 20 minutes, the batch was cooled and milled.

Percent thickener _____ 10
Pen.—
    Unworked _____ 330
    Worked _____ 344
    (Worked 100,000 strokes) _____ 365
Percent leakage 24 hrs./210° F _____ 5–10

As lubricants are required to perform at higher and higher temperatures because of increased speeds of engines and machines, the advent of jet propulsion, atomic energy as a source of power, etc., it has become increasingly difficult to prepare greases fulfilling the requirements of such lubricants. In attempting to provide such greases, the art has progressed from the use of petroleum lubricant vehicles thickened with metal soaps of long chain fatty acids, e.g. lithium hydroxy-stearate, to more thermally stable synthetic lubricating oils such as the aliphatic diesters of dicarboxylic acids, silicone polymers, etc., thickened with such soaps or inorganic materials such as silica gels. The progress of thickener research has not in general, however, kept pace with the development of lubricant vehicles. And at temperatures as high as 400° to 450° F. there are few if any greases available which will retain their consistency and lubricity for any substantial period of time.

In recent years various synthetic lubricant vehicles, e.g. the silicones, fluorocarbons, etc., have been found to be potentially valuable for use in greases employed at very high temperatures because of their thermal stability and relatively low volatility. Unless, however, a thickener having substantially the same degree of thermal stability is available to produce a grease from such an oil, is of little use.

The ureido compounds above described are particularly suitable for use in the formulation of lubricants. The term "lubricants" is used herein to denote normally liquid lubricants, i.e. lubricating oils, and lubricating greases.

The ureido compounds above defined and described have been found to be exceptionally effective as oil-thickeners to obtain lubricating grease compositions which exhibit good rheological properties, high thermal stability, high drop points and/or no-melt characteristics. Such grease compositions are obtained by incorporating in a suitable normally liquid oleaginous lubricant vehicle for from about 2% to about 25% by weight, of at least one ureido compound having the general Formula I, supra. The grease can be prepared by forming the ureido compound in situ in the oleaginous lubricant vehicle or a concentrate of the ureido compound in an oleaginous vehicle can be preformed and the preformed thickener then mixed with the necessary amount of the lubricant vehicle to give a grease product containing the required concentration of the thickener. Concentrates containing 25% to about 60% of the ureido thickener can be used, although concentrates containing from about 40% to about 50% of the ureido thickener are preferred.

In the in situ method of preparing the grease, the desired amount of the polyisocyanate is placed in a high temperature grease kettle, or other suitable heating equipment, containing a major proportion of the liquid lubricant vehicle to be used and the mixture heated to effect solution. To the heated solution is added the hydroabietylamine and the balance of the oil or a solution of the hydroabietylamine in the balance of the liquid lubricant vehicle and the mixture heated to a temperature of about 200° F. to 450° F. and maintained at said temperature until the product increases to the desired consistency. The temperature at which the mixture sets-up depends largely upon the nature of the liquid lubricant vehicle employed. When using a hydrocarbon oil such as a petroleum oil the mixture sets-up or reaches the desired consistency when the temperature reaches 350°–400° F., while when using a synthetic oil, such as a dialkyl ester of a dibasic carboxylic acid, such as di-isooctyl azelate, dialkyl sebacate, etc., the desired consistency is obtained by heating to 220° F.–320° F. The grease product is then finished by cooling and milling. The preparation of greases of the herein described invention lends itself very favorably to continuous manufacture methods. A suitable method comprises mixing the reactants and oil in a grease kettle and passing the mixture through a votator at a temperature of from about 220° F. to about 450° F. depending upon the oil vehicle used, passing the resultant material through a cooling stage votator, and then milling the product. In place of a votator, other suitable continuous process equipment can be employed.

The pure 100% ureido compounds obtained as described above is not efficiently suitable, as such, as oil thickeners for the preparation of greases. However, when a 70–80% solution of the herein described abietyl amine and a 30%–20% solution of the polyisocyanate in an oil, for example a petroleum oil of suitable viscosity, are combined at a temperature of from about 70° F. to about 300° F. preferably about 200° F., effective thickeners for lubricating greases are obtained. The concentrate can be suitably prepared by maintaining a solution of the herein described abietyl amine and an oil, for example a petroleum oil of suitable viscosity, at about 80° F., and a solution of the polyisocyanate and the oil at about 200° F., and combining the two solutions in a spray nozzle and permitting the sprayed droplets of reacting solutions to fall freely in a spray tower. By controlling the rate of flow with respect to the internal volume of the spray nozzle, the reacting solution is discharged before crystallization occurs, and most of the precipitation of the resultant reaction product occurs during the fall through the spray tower. The precipitated droplets are suitably collected in shallow pans at the bottom of the spray tower and the collected material permitted to cool to ambient room temperature in a quiescent state. Concentrates of from about 25% to about 60% of the ureido compound in oil can be prepared by the above method, although obviously the method is equally suitable for the preparation of smaller or larger amounts of the ureido compound in oils. The so-called spray technic above described, is described and claimed in co-pending application Serial No. 750,015, filed July 21, 1958, now U.S. Patent No. 2,925,387, by T. Traise et al.

Lubricating greases can be readily prepared with the above described ureido concentrates by charging the ureido concentrate to a mixing kettle, adding a portion of the oil vehicle thereto, while stirring and raising the temperature to about 200° F. to 250° F., preferably about 200° F. At this temperature, the remaining portion of the oil vehicle required to bring the grease to the final desired thickener concentration is added, and the temperature of the mix raised to about 350° F. to 410° F., preferably about 395° F., at which temperature it is held for about 5 to 60 minutes, preferably about 30 minutes. The grease is then cooled to about 175° F. to 300° F., preferably about 200° F., and such additives as desired then incorporated in the product. The grease is then passed through a colloid mill and packaged.

Oleaginous lubricant vehicles which can be thickened with the herein described polyureido compounds to form greases of the present invention can be silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" (made by Hooker Chemical Company) and the trifluorochloroethylene polymers, known as "Kel–F–40" (made by The M. W. Kellogg Company), and other lubricant vehicles.

Other oleaginous vehicles which may be employed herewith are, for example, mineral oils in the lubricating oil viscosity range, i.e. from about 50 S.S.U. at 100° F. to about 300 S.S.U. at 210° F. These mineral oils may be suitably solvent extracted, with phenol, furfural, B,B'-dichlorodiethylether (Chlorex), liquid $SO_2$, nitrobenzene, etc. Synthetic lubricating oils resulting from polymerization of unsaturated hydrocarbons or other oleaginous materials within the lubricating oil viscosity range such as high molecular weight polyoxyalkylene compounds such as polyalkylene glycols and esters thereof, aliphatic diesters of dicarboxylic acids such as the butyl, hexyl, 2-ethylhexyl, decyl, lauryl, etc. esters of sebacic acid, adipic acid, azeleic acid, etc., may be thickened by the ureido compounds of the present invention to produce excellent greases. Polyfluoro derivatives of organic compounds, particularly hydrocarbons, and dibasic acid esters of $H(CF_2)_nCH_2OH$, in the lubricating oil viscosity range can be thickened with compounds of the present invention. Other synthetic oils, such as esters of aliphatic carboxylic acids and polyhydric alcohol, e.g. trimethylolpropane pelargonate, pentaerythritol hexanoate, can be used as suitable oil vehicles.

The following examples are illustrative of the preparation of lubricating greases in accordance with the present invention:

EXAMPLE II

Three grams of bitolylene diisocyanate was mixed with a large proportion of the total amount of a solvent extracted base petroleum oil to be used, and the mixture heated to about 150° F. to effect solution of the isocyanate in the oil. To the heated solution were added seven grams of dehydroabietyl amine and additional base oil in amount sufficient to give a total of 90 grams of said oil and the mixture heated to a temperature of 380° F. to 390° F. and maintained at said temperature until the mixture increased to the desired consistency. The grease product was then finished by passage through a mill.

EXAMPLE III

A grease product formulated with 1.5 grams bitolylene diisocyanate, 3.5 grams dehydroabietyl amine and 95 grams of solvent extracted No. 40 Base Oil was prepared in the manner described in Example I.

EXAMPLE IV

A grease product formulated with 1.8 grams bitolylene diisocyanate, 4.2 grams dehydroabietyl amine and 94 grams of solvent extracted No. 40 Base Oil was prepared in the manner described in Example I. To the thickened oil were added 0.2% phenothiazine.

EXAMPLE V

A grease product formulated with 1.8 grams bitolylene diisocyanate, 4.2 grams dehydroabietyl amine and 94 grams of solvent extracted No. 40 Base Oil was prepared in the manner described in Example I.

EXAMPLE VI

A grease product formulated from 7 grams "Hercules Rosin Amine D," 3 grams bitolylene diisocyanate and an oil vehicle consisting of 45 grams trimethylol propane pelargonate and 45 grams pentaerythritol hexanoate was prepared by mixing the bitolylene diisocyanate with a majority of the oil and heating to about 150° F. to effect solution, adding to the resultant solution a solution of the "Rosin Amine D" in the remainder of the oil vehicle, and heating the mixture at about 260° F. until the reaction is complete and the desired consistency obtained. The grease finished by milling had an unworked penetration at 77° F. of 268.

EXAMPLE VII

A grease product formulated from 7 grams "Rosin Amine D," 3 grams bitolylene diisocyanate and 90 grams di-isooctyl azelate was prepared by the method described in Example VI. The finished grease had an unworked penetration at 77° F. of 250.

EXAMPLE VIII

A grease product formulated from 6.3 grams "Rosin Amine D," 2.7 grams bitolylene diisocyanate and an oil vehicle consisting of 44.8 grams di-isooctyl azelate and 44.8 grams No. 5 Base Oil, 0.3 gram Ortholeum 300, 1.0 gram Alox 125 and 0.1 gram of a metal deactivator was prepared by mixing the bitolylene diisocyanate with the No. 5 Base Oil and the majority of the di-isooctyl azelate and heating to about 150° F. to effect solution; adding to the resultant solution a solution of the "Rosin Amine D" in the remainder of the di-isooctyl azelate, and heating the mixture at about 310° F. until the reaction is complete and the desired consistency obtained, and cooling the grease to about 250° F. and adding the Alox 125, Ortholeum 300 and the metal deactivator. The grease finished by milling had an unworked penetration at 77° F. of 293.

EXAMPLE IX

To 2020 grams of a 21% solution of bitolylene diisocyanate in a solvent extracted SAE −10 mineral oil, at a temperature of about 200° F. were added 2540 grams of a 37.5% solution of dehydroabietyl amine in a solvent extracted SAE −10 mineral oil maintained at room temperature (about 72° F.), and the mixture passed through a colloid mill, or a Votator. The resultant product was a 30% concentrate of the ureido compound in the SAE −10 mineral oil base. Portions of the concentrate were added to solvent extracted mineral oil of about 800 S.S.U. at 100° F., and the mixtures heated at temperatures of 380° F.–400° F. for about 30 minutes. Greases containing 6%, 7%, 8% and 10% of the ureido compound thickener were so made. For the purpose of comparison, temperatures of 300° F. to 350° F. were used in the final step of mixing the concentrate with the mineral oil vehicle.

Comparative test data concerning these grease products are given in Table III, following.

EXAMPLE X

A preformed abietyl amine-polyisocyanate concentrate was prepared as follows: A 25% solution of bitolylene in a solvent extracted SAE 10 base mineral oil was prepared by heating the components to 200° F., and a 75% solution of "Rosin Amine D," supra, in a solvent extracted SAE 10 base mineral oil was prepared by mixing at about room temperature. The isocyanate solution at a temperature of 160–190° F., and the amine solution at a temperature of 70–100° F., were then rapidly mixed in a mixing chamber, and before precipitation of the reaction product could occur the mixture was passed through a spray nozzle and sprayed into the top of a spray tower. Precipitation of the reaction product occurred as the sprayed droplets fell through the spray tower. The precipitated thickener concentrate, collected in a receiver at the bottom of the spray tower, was removed from the tower and allowed to cool to ambient room temperature. The thickener concentrate, containing about 45% of the isocyanate-amine reaction product was a pale yellow granular solid having the appearance of light yellow sugar.

A lubricating grease was prepared from the preformed thickener concentrate by forming a heavy base by combining in a grease kettle 20 parts of the above thickener concentrate and 15 parts of a solvent extracted SAE 10 base mineral oil, heating the heavy base to 200° F. and grading in 65 parts of a solvent extracted SAE 40 base mineral oil. The resultant fluid mixture containing about 10% of the ureido compound was heated to and maintained at 390–400° F. for 30–45 minutes, cooled to 200° F. and passed through a colloid mill.

As shown below, a grease product of the present invention passed with a wide margin the following requirements of the military specification MIL-G-3278.

| Test | Example VIII | MIL-G-3278 |
|---|---|---|
| Leakage 30 hrs.—212° F. | 1.9% | 5% allowable. |
| Evaporation test (VVL-791-35.1). | 1.47% | 1.5% allowable. |
| Apparent viscosity 1-65° F. | 20 sec.⁻¹=4,000 poises. | 10,000 poises-max. |
| | 50 sec.⁻¹=2,800 poises. | 6,000 poises-max. |
| Low temperature torque (−65° F.). | 1 rev. right=1 sec. | 5 sec. |
| | 1 rev. left=1 sec. | Do. |
| Water immersion | Passes | Not separate or cloud water. |
| Oxidation stability | 5 lb. loss—500 hrs. | 5 lb. loss every 100 hrs. |
| Drop point | 488° F. | Above 325° F. |

The unworked and worked penetration at 77° F. of the products of Examples II to V are given in the following Table I.

Table I

| Example | Penetration at 77° F. | | |
|---|---|---|---|
| | Unworked | 60 strokes | 100,000 strokes |
| II | 228 | 240 | |
| III | 292 | 307 | 311 |
| IV | 267 | 271 | |
| V | 270 | 279 | 289 |

Additional tests with Examples IV and V are given in Table II.

Table II

| Test | Example IV | Example V |
|---|---|---|
| Leakage (212° F.) [1] | 1% | 2%. |
| Wheel bearing (250° F.) [2] | Excellent (no leakage) | Good (0.2 gm. leakage). |
| H.S.-H.T. bearing test (350° F.) [3] | 148 hrs | 243 hrs. |
| H.S.-H.T. bearing grease test (250° F.). | | 2,400+ hrs. |
| H.S.-H.T. bearing grease test (300° F.). | | 740 hrs. |
| Water absorption [4] | 60% (no oil separation) | |
| Water resistance (1 hr. −120° F.) [5] | Excellent | |
| Humidity cabinet (120° F.—100% R.H.) [6] | 24 hrs.—No rust. 48 hrs.—Trace on 1 panel. | |
| N.H. oxidation bomb [7] | 3 lb. loss—114 hrs. | 4 lb. loss—114 hrs. |
| | 11.5 lb. loss—402 hrs. | 9.5 lb. loss—402 hrs. |
| Free water corrosion [8] | 2-CRC rating | |
| Oven studies (72 hrs.—212° F.) [9] | Unworked 268 | 268. |
| | After 72 hrs. 205 | 219. |
| | Worked 60 strokes 272 | 272. |
| Drop point [10] | 455° F | 465° F. |

[1] 10 g. sample—60 mesh cone (ANG-3).
[2] ASTM Method 1263-53T.
[3] ABEC-NLGI Technical Bulletin No. 5, November 1944.
[4] ANG-3 test. 1 ml. additions of dist. H₂O stirred into a 20 g. sample of grease until H₂O no longer absorbed by the grease.
[5] ASTM D1264-53T.
[6] AN-H-31 Cabinet.
[7] ASTM Method D952-50.
[8] Proposed method "Bearing Corrosion In Presence of Free Water." CLR airframe laboratory group.
[9] Grease is spread out on watch glasses and subjected to the oven aging.
[10] ASTM Method D566-42.

The properties of grease products prepared in Example IX are tabulated in Table III.

Table III

| Test No. | 1 | 2 | 3 | 4 | 5 | 6 |
|---|---|---|---|---|---|---|
| Thickener, percent | 10 | 8 | 6 | 7 | 7 | 7 |
| Processing temp., °F | 400 | 390 | 380 | 390 | 300 | 350 |
| Penetration, 0/60 | 199/226 | 252/245 | 345/347 | 267/276 | Too soft | Too soft |
| Leakage, percent | 0 | 0.9 | 3.0 | 2.2 | | |
| Roll stability [1]—Hrs.: | | | | | | |
| 0 | 220 | 263 | 339 | 284 | | |
| 4 | 243(10.4%) | 273(3.8%) | 363(9%) | 300(5.7%) | | |
| 100 | 267 | 296 | | 320 | | |
| 150 | 269 | 203 | | 320(11.2%) | | |
| 200 | 267(21%) | 302(11%) | | | | |

[1] The Roll Stability Test, which simulates conditions encountered by roller bearing greases in actual operation, is a measure of the mechanical stability of a grease. The apparatus and method used is that described in the Institute Spokesman, vol. 6, No. 12, pp. 1-4, 5 (1943). Briefly, the test involves determining the micropenetration of the grease at 77° F. after being worked for 60 strokes, transferring the grease (about 100 grams) to the "Precision" Shell Roller Tester and running the machine for 4 hours, during which time the grease is kneaded. At the end of 4 hours, a micropenetration at 77° F. of the grease is determined. The initial reading and the final reading are reported with the difference between them reported as percent decrease or increase change. The rating is as follows:

| Percent change—Increase or decrease | Rating |
|---|---|
| 0-10% | Excellent. |
| 10.1-25.0% | Good. |
| 25.1-60.0% | Fair. |
| Over 60.1% | Poor. |

NOTE.—The test can be continued for periods up to 200 hours to determine the further mechanical stability of the grease.

| | Weight percent | | |
|---|---|---|---|
| Dehydroabietyl amine | 2.45 | 3.15 | 3.85 |
| Bitolylene diisocyanate | 1.05 | 1.35 | 1.65 |
| Mineral oil base | 86.9 | 85.9 | 84.9 |
| Lead tallate | 6.5 | 6.5 | 6.5 |
| Sulfurized sperm oil | 1.5 | 1.5 | 1.5 |
| Chlorinated hydrocarbon | 1.5 | 1.5 | 1.5 |
| Dodecyl hexasulfide | 0.1 | 0.1 | 0.1 |

Greases prepared by the method in which the ureido thickener is formed in situ and greases prepared by the method in which the ureido thickener is preformed as a concentrate as in Examples IX and X are comparable as demonstrated by the data in Table IV.

Table IV

| Ureido thickener | Preformed | In situ |
|---|---|---|
| Percent thickener | 8 | 7 |
| Mechanical stability, percent change | 5 | 5 |
| Leakage resistance, percent loss | 2.5 | 2.0 |
| Water resistance | Excellent | Excellent |
| Drop point, °F | 480 | 480 |

The grease products of Examples V and VI were subjected to the tests tabulated in Table V.

Table V

| | Example V | Example VI |
|---|---|---|
| Navy Gear Wear Test:[1] | | |
| 5 pounds:[2] | | |
| Left, weight loss (mg.) | 0.82 | 0.82 |
| Right, weight loss (mg.) | 1.08 | 0.83 |
| 10 pounds:[3] | | |
| Left, weight loss (mg.) | 2.3 | 2.1 |
| Right, weight loss (mg.) | | |
| Drop point,[4] °F | 450 | 450 |
| High-speed bearing test—250° F.,[5] hours | 1210+ | 950 |

[1] MIL-G-3278 test (development described in detail by following reference: Ninos, N.J., Inst. Spokesman, 15 No. 3, 8 (1951)).
[2] 5 pound Pass=2.5.
[3] 10 pound Pass=3.5.
[4] ASTM method D566-42.
[5] ABEC-NLGI Technical Bulletin No. 5, November 1944.

The grease product of the present invention can contain one or more well known additives or addition agents to impart various desired properties thereto such as, by way of example, antioxidants, extreme pressure agents, corrosion inhibitors, anti-leak agents, anti-foam agents, mineral lubricants such as graphite, molybdenum sulfide, etc.

The following are illustrative examples of grease products containing additives which impart "heavy duty" properties to the grease.

Greases of the type herein described, particularly embodying hydrocarbon lubricating oils, are useful under conditions encountered in normal automotive and industrial uses, and are suitable for fulfilling the requirements of multi-purpose greases.

Percentages and parts given herein and in the appended claims are by weight, unless otherwise stated.

The ureido compounds such as herein described are being claimed in our co-pending divisional application Serial No. 99,025, filed March 29, 1961.

Although the present invention has been described with reference to specific embodiments thereof, the invention is not limited thereto, but includes within its scope such modifications and variations as come within the scope and spirit of the appended claims.

This application is a continuation-in-part of abandoned application Serial No. 601,111, filed July 31, 1956.

We claim:

1. A lubricant composition comprising at least about 40% of a normally liquid lubricating oil and from about 2% to about 60% of at least one ureido compound having the general formula

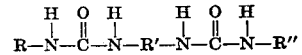

wherein R and R'' are abietyl radicals selected from the group consisting of a dehydroabietyl radical, a dihydroabietyl radical, a tetrahydroabietyl radical and mixtures thereof, and R' is an organic radical selected from the group consisting of an alkylene radical of from 1 to about 30 carbon atoms, and an arylene radical.

2. A lubricating composition as described in claim 1 in which the normally liquid lubricating oil is a hydrocarbon lubricating oil.

3. A lubricating composition as described in claim 1 in which the normally liquid lubricating oil is an acyclic ester of an aliphatic dicarboxylic acid.

4. A lubricating composition as described in claim 1 in which the normally liquid lubricating oil is a silicone polymer oil in the lubricating oil viscosity range.

5. A lubricating grease composition comprising a normally liquid lubricant vehicle thickened with from about 2% to about 25%, by weight, of at least one ureido compound having the general formula

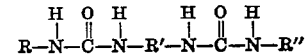

wherein R and R" are abietyl radicals selected from the group consisting of a dehydroabietyl radical, a dihydroabietyl radical, a tetrahydroabietyl radical and mixtures thereof, and R' is an organic radical selected from the group consisting of an alkylene radical of from 1 to about 30 carbon atoms, and an arylene radical.

6. A lubricating grease composition as described in claim 5 in which the normally liquid lubricant vehicle is a hydrocarbon lubricating oil.

7. A lubricating grease composition as described in claim 5 in which the normally liquid lubricant vehicle is an acyclic ester of an aliphatic dicarboxylic acid.

8. A lubricating grease composition as described in claim 5 in which the normally liquid lubricant vehicle is a silicone polymer oil in the lubricating oil viscosity range.

9. A lubricating grease composition comprising a normally liquid hydrocarbon lubricating oil thickened with from about 2% to about 25%, by weight, of at least one ureido compound having the general formula

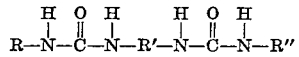

in which R and R" are dehydroabietyl radicals and R' is an arylene radical.

10. A lubricating grease composition comprising a normally liquid hydrocarbon lubricating oil thickened with from about 2% to about 25%, by weight, of at least one ureido compound having the general formula

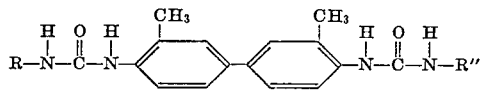

in which R and R" are dehydroabietyl radicals.

11. A lubricating grease composition comprising a normally liquid hydrocarbon lubricating oil thickened with from about 2% to about 25%, by weight, of a mixture of ureido compounds having the general formula

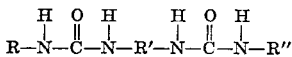

in which R and R" are abietyl radicals selected from the class consisting of a dehydroabietyl radical, a dihydroabietyl radical, a tetrahydroabietyl radical and mixtures thereof, and R' is a ditolylene radical, about 60% of said mixture being a ureido compound of said general formula in which R and R" are dehydroabietyl radicals, about 30% of said mixture being a ureido compound of said general formula in which R and R" are dihydroabietyl radicals and about 10% of said mixture being a ureido compound of said general formula in which R and R" are tetrahydroabietyl radicals.

12. A lubricating grease thickener concentrate comprising a normally liquid lubricant vehicle containing from about 25% to about 60%, by weight, of at least one ureido compound having the general formula

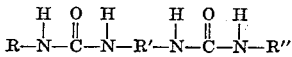

wherein R and R" are abietyl radicals selected from the group consisting of a dehydroabietyl radical, a dihydroabietyl radical, a tetrahydroabietyl radical and mixtures thereof, and R' is an organic radical selected from the group consisting of an alkylene radical of from 1 to about 30 carbon atoms, and an arylene radical.

13. A lubricating grease thickener concentrate as described in claim 12 in which the normally liquid lubricant vehicle is a hydrocarbon lubricating oil.

14. A lubricating grease thickener concentrate comprising a normally liquid hydrocarbon lubricating oil containing from about 25% to about 60%, by weight, of at least one ureido compound having the general formula

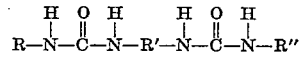

in which R and R" are dehydroabietyl radicals and R' is an arylene radical.

15. A lubricating grease thickener concentrate comprising a normally liquid hydrocarbon lubricating oil containing with from about 40% to about 50%, by weight, of at least one ureido compound having the general formula

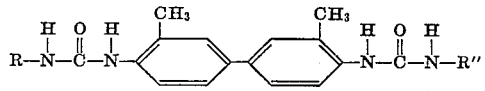

in which R and R" are dehydroabietyl radicals.

16. A lubricating grease composition comprising a normally liquid hydrocarbon lubricating oil thickened with from about 40% to about 50%, by weight, of a mixture of ureido compounds having the general formula

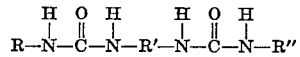

in which R and R" are abietyl radicals selected from the class consisting of a dehydroabietyl radical, a dihydroabietyl radical, a tetrahydroabietyl radical and mixtures thereof, and R' is a ditolylene radical, about 60% of said mixture being a ureido compound of said general formula in which R and R" are dehydroabietyl radicals, about 30% of said mixture being a ureido compound of said general formula in which R and R" are dihydroabietyl radicals and about 10% of said mixture being a ureido compound of said general formula in which R and R" are tetrahydroabietyl radicals.

References Cited in the file of this patent

UNITED STATES PATENTS

| | | |
|---|---|---|
| 2,142,688 | Brodersen et al. | Jan. 3, 1939 |
| 2,374,136 | Rothrock | Apr. 17, 1945 |
| 2,409,829 | Boon | Oct. 22, 1946 |
| 2,520,901 | Benoit | Sept. 5, 1950 |
| 2,663,730 | Hill et al. | Dec. 22, 1953 |
| 2,710,839 | Swakon et al. | June 14, 1955 |
| 2,710,840 | Swakon et al. | June 14, 1955 |
| 2,710,841 | Swakon et al. | June 14, 1955 |
| 2,734,082 | Fancher | Feb. 7, 1956 |